United States Patent [19]
Riddel

[11] 3,842,673
[45] Oct. 22, 1974

[54] TANK LEVEL UNIT WITH WAVE POTENTIOMETER AND TRANSVERSE COIL SPRING DEFLECTION

[75] Inventor: John W. Riddel, Fenton, Mich.
[73] Assignee: General Motors Corporation, Detroit, Mich.
[22] Filed: Aug. 20, 1973
[21] Appl. No.: 389,962

[52] U.S. Cl. ................................ 73/313, 338/33
[51] Int. Cl. ........................................ G01f 23/10
[58] Field of Search ......... 73/313, 308; 338/33, 151

[56] References Cited
UNITED STATES PATENTS

| 2,437,203 | 3/1948 | McCandless | 73/313 |
|---|---|---|---|
| 2,624,821 | 1/1953 | McCandless | 338/33 |
| 3,348,413 | 10/1967 | Zimmerle | 73/313 |
| 3,432,790 | 3/1969 | Svilpe et al. | 73/313 X |
| 3,482,200 | 12/1969 | Hamilton | 73/313 X |

FOREIGN PATENTS OR APPLICATIONS

| 837,383 | 11/1938 | France | 73/313 |
|---|---|---|---|
| 1,494,900 | 8/1967 | France | 73/313 |

Primary Examiner—James J. Gill
Assistant Examiner—Joseph W. Roskos
Attorney, Agent, or Firm—K. H. MacLean, Jr.

[57] ABSTRACT

A liquid level responsive sending unit for use in fuel tanks or the like including a coil spring support affixed at one end to an inner wall of the tank and having a pivotally movable member attached to its free end. The pivotal member operably engages a float which moves in a generally vertical direction when the liquid level changes in the tank. A stationary member extends in side-by-side relation to the pivotal member. An elongated wire-wound resistor is mounted on one of the aforesaid members and is insulated therefrom. Changes in the liquid level causes movement of the float which, in turn, pivots the movable member and produces relative sliding contact between one of the members and the resistor. The sliding contact completes an electrical circuit through the resistor at various places along its length corresponding to different liquid levels in the tank to produce a variable resistance in the circuit extending through the resistor and the contacting member.

3 Claims, 3 Drawing Figures

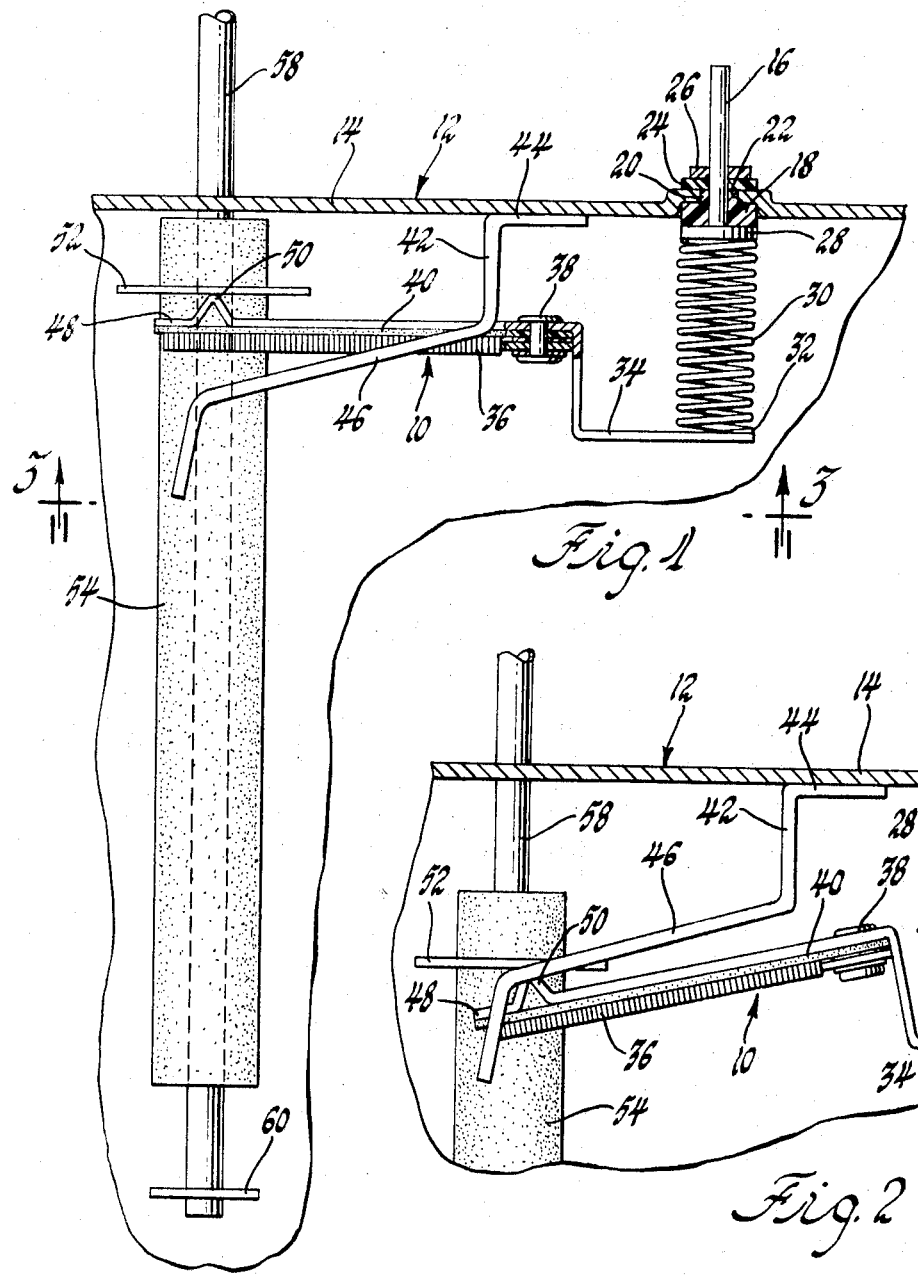
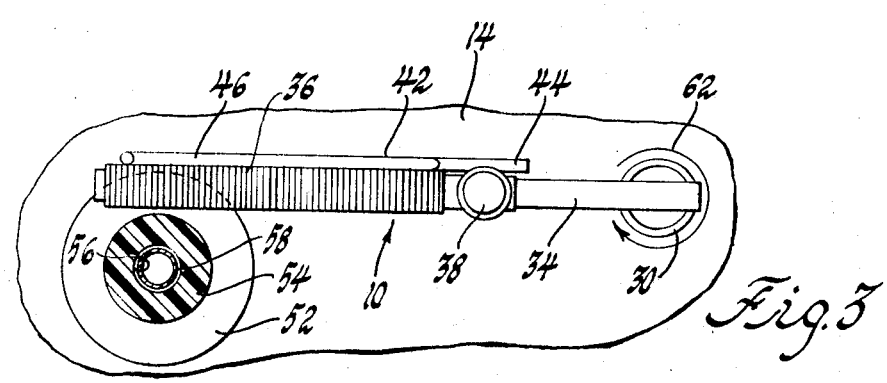

TANK LEVEL UNIT WITH WAVE POTENTIOMETER AND TRANSVERSE COIL SPRING DEFLECTION

This invention relates to liquid level responsive sending units, particularly adapted for use in fuel tanks or the like.

The subject liquid level sending unit is compact and of simple construction with few parts. The sender is easily calibrated and its output may be varied to produce a signal which is linear in nature despite non-uniformities of the tank contour with tank depth.

The subject sending unit includes a movable member and a stationary member which are arranged in substantially side-by-side relation to one another. A float member movable in a generally vertical direction with liquid level changes engages the end of the pivotal member to cause it to move with respect to the adjacent stationary member. A sliding contact is produced between an elongated wire-wound electrical resistor which is supported on one of the members and the other member which contacts it. The contacting member engages the elongated resistor at various locations along its length corresponding to different liquid levels in the tank. This produces a variable resistance circuit extending through the resistor and the contacting member.

One end of the movable member is engaged by the float member. The other end is attached to an unrestrained or free end of a cantilever mounted coil spring. The cantilever mounted coil spring has a fixed end which is attached to an inner wall of the tank. Movement of the float pivots the movable member by lateral dislocation of the free end of the coil spring with respect to its axis. This lateral dislocation produces a desirable constant and low force upon the pivotal member. The coil spring support of the movable member also produces a rugged and compact support for it. The coil spring is relatively unsusceptible to damage by shocks or rapid pivotal movement of the level sensing member. Thus, it is very durable. In addition, the coil spring is relatively free from damage from corrosion or blockage by foreign material which may be deposited thereon.

The use of an elongated wire-wound resistor which is engageable with an adjacent contacting member allows simple and reliable calibration of the sending unit by simply shaping the contacting member until a desired output is obtained. Thus, where the tank has a non-uniform contour as the depth changes, it is desirable to have a non-linear response of the sender unit which corresponds to vertical movement of the float member. This may produce a uniform indication of the changes in liquid volume within the tank despite non-uniformities in the tank contour. Another instance in which a non-linear response with liquid level changes may be desirable is when the sender unit is connected to an indicating gauge which itself is non-linear in response.

The movable member and the stationary member of the sending unit are substantially in side-by-side relation to one another. The elongated wire-wound resistor is mounted upon one of the members and insulated therefrom with one end electrically connected to a terminal which is insulated from the tank and accessible from the exterior. A portion of the other member extends across the elongated resistor angularly with respect to the resistor axis and contacts the resistor along its length to establish a circuit therebetween. As the movable member is pivoted with respect to the stationary member, the engagement with the resistor produces a sliding contact at variable locations along its length to produce a variable resistance output. The engagement between the contacting member and the resistor is a line contact extending across several resistor wires due to their relative annular relation. This is desirable in that wear caused by the engagement is spread over several wires of the resistor. This extends the operable life of the unit.

The float member of the subject level responsive sending unit is of tubular construction with an inner bore adapted to encircle a discharge line extending downward into the interior of the tank. The discharge line guides movement of the float as the liquid level changes and consequentially eliminates the need for accessory members to guide the float. In addition, this arrangement minimizes the chance of the float being hung up or stuck in one position.

Further objects and advantages of the invention will be more readily apparent from the following detailed description reference being had to the accompanying drawings in which a preferred embodiment is illustrated.

THE DRAWINGS

FIG. 1 is a fragmentary section view taken through a tank and showing the subject level responsive sending unit in one mode of operation;

FIG. 2 is a fragmentary view similar to FIG. 1, but showing the sending unit in a second mode of operation;

FIG. 3 is a view looking in the direction of arrow 3 in FIG. 1.

A liquid level responsive sending unit 10 is shown in a tank 12 having a top wall 14. The sender 10 includes an output terminal 16 encircled by a grommet member 18 having a squared end 20 which is adapted to fit within a square bore 22 of wall 14. A washer 24 is adapted to fit over the upper end of terminal 16 and engage the exterior surface of the tank 12 to prevent leakage. A retainer 26 engages washer 24 to press it against the exterior surface of the tank. The lower end of the terminal 16 has an enlarged portion 28 which is attached to one end of a coil spring 30. The coil spring 30 extends into the interior of tank 12 and has a free end 32 to which is mounted one end of a movable member 34 which extends from the free end 32 in a radial direction with respect to the axis of the spring 30. As can be seen in FIGS. 1 and 2, the movable member 34 is pivotal about the end 32 of coil spring 30 by lateral deflection of the free end 32 of the spring 30 from its axis.

An elongated wire-wound resistor or potentiometer 36 is mounted upon the movable member 34 by a rivet-type fastener 38 which also connects one of the ends of the resistor to the member 34. A flat insulating member 40 is also held between the wire-wound resistor 36 and the movable member 34 by the rivet 38. Thus, rivet 38 connects the resistor in an electric circuit including the member 34, coil spring 30 and terminal 16 which is insulated by grommet 18 from the tank 12. The other end of the wire-wound resistor 36 is not connected to the member 34.

A stationary contact member 42 is affixed at one end 44 to the inner surface of wall 14. A mid-portion 46 of the member 42 extends in side-by-side relation to the wire-wound resistor 36. As the movable member 34 is pivoted about the coil spring 30 by lateral deflection of free end 32, the resistor 36 is moved with respect to the member 42 and produces an electrical contact therebetween along the length of the resistor 36. This produces a circuit from terminal 16 through coil spring 30, member 34, rivet 38, the connected end of resistor 36 and the resistor to the contact member 42 and well 14 which may be grounded. Thus, the resistance in the aforedescribed circuit is varied by the relative position of the contact between the resistor and the contact member. There is the least resistance when the movable member 34 is in its free or relaxed position in FIG. 1 and the greater resistance when the movable member 34 is pivoted.

The end 48 of the movable member 34 is formed into a V-shaped contact yoke 50 which engages a circular collar member 52 on a float 54. The float 54 has a generally cylindrical shape with a bore extending axially through the float (best shown in FIG. 3). Bore 56 extends around a generally vertical fuel outlet line or discharge member 58 which removes liquid from tank 12. The other end of the discharge member 58 has a retainer 60 thereon which limits downward movement of float 54 when the level of liquid in the tank corresponds to an empty condition. Movement of the float 54 caused by liquid level changes in tank 12 moves the collar 52 into contact with the end of member 34 at point 50 which causes the member 34 to pivot from its unstressed position in FIG. 1 toward a stressed position in FIG. 2.

The pivotal movement of the member 34 causes corresponding movement of the resistor 36 with respect to the adjacent contact member 42. This relative movement between the resistor 36 and contact member 42 causes the mid-portion 46 of member to engage resistor 36 along its length corresponding to the degree of pivotal movement of the member 34. This will change the resistance in the circuit extending from the terminal 16 through coil spring 30, arm 34, rivet 38 and resistor 36 to the member 42 and to ground.

The present invention provides a simple and effective means for establishing a contact between member 42 and resistor 36. The grommet 18 which secures terminal 16 within wall 14 of tank 12 has squared portion 20 within the squared bore 22. This prevents the terminal 16 from turning once the retainer 26 is in place. Likewise, the coil spring 30 which is attached at its upper ends to portion 28 of the terminal 16 is fixed in angular relation to wall 14 by the squared portion 20. The connection between the squared portion 20 and the square bore 22 is made after the terminal and spring are given a twist or torsional force past the point where contact is made between resistor 36 and member 42. The clockwise torque of terminal 16 in bore 22 is shown in FIG. 3 by the arrow 62. This develops a torsional force (also shown by arrow 62) between the resistor 36 and the contact member 46.

In the embodiment as illustrated, to prevent excessive contact forces between resistor 36 and member 46 which might tend to wear the resistor wires excessively, the pivotal distance between the contact point and the axis of the coil spring is about 1 inch.

The use of a cantilever mounted coil spring having an arm member extending therefrom as a support for the resistor has several advantages. It is obvious that the coil spring is a very simple and a relatively rugged support. Damage from vibrations or the rapid and excessive movement of the movable member 34 pose little danger to the coil spring mounted sender arm. In addition, the bending moment produced by the lateral distortion or deflection of the free end of the coil spring is relatively constant over a fairly wide range of pivotal movement of the movable arm. The force produced is a relatively low force particularly well adapted for use with liquid level sending units.

The coil spring as a resistor support provides a versatile sender unit which can be readily modified or adjusted to provide a greater or less bending moment and greater or less contact pressure between the resistor and contact arm. Selection of spring materials and dimensions is a readily available adjustment means. The present embodiment has been constructed utilizing a 1 inch long by ⅜ inch diameter coil spring having nine turns of 0.050 inch diameter wire. A float weighing 29 grams was also used. The pivotal member had a length of 2½ inches while the resistor had an active length of about 1½ inches.

While as previously stated, many materials may be used for the float, it is desirable to provide a float with a total weight not greatly different from the weight of the fluid displaced by the float. This assures that the coil spring will not be heavily biased by quick movements of the float within the tank due to jolting or bouncing of the liquid level. In addition, it is known that a body having a near zero buoyancy in a liquid will not tend to move relative to the fluid during acceleration or deceleration whereas a heavier body will tend to move opposite of the direction of acceleration and a less dense body will move in the same direction.

The subject liquid level responsive sending unit is also very versatile and easily calibrated by varying the relation between the arm member's pivotal movement and the resistance produced by simply reconfiguring the contact arm. As previously stated, this is an advantage when there is a non-uniform relation between the change in liquid level and the change in volume of liquid leaving the fuel tank. Also, this can be used to correctly calibrate the indicating system whenever a non-linear gauge is utilized.

The illustrated embodiment shows an elongated resistor mounted upon the pivotal or movable arm which makes contact with a stationary member. Other embodiments intended to fall within the scope of the invention as claimed include: mounting the resistor upon the stationary arm and using the movable arm as contact and ground; using either end of the resistor as a connector to the terminal.

While a preferred embodiment is illustrated, other embodiments within the scope of the invention as claimed below may be adapted.

What is claimed is as follows:

1. A liquid level responsive sending unit for fuel tanks or the like comprising: a coil spring support within the tank interior; a first end of said coil spring supported by a tank wall; the second end of said coil spring attached to one end of an elongated pivotal member; an elongated stationary member having a portion extending generally in side-by-side relation with respect to said pivotal member and supported in the tank; an elongated wire-wound resistor supported by one of said members and having an end of said resistor electrically connected thereto; insulation means between said resistor and said one member for providing an electrical circuit extending through said one member, said connected end of said resistor and through said resistor; float in the tank interior movable as the level of liquid therein changes; means on said float operably engageable with the other end of said pivotal member to pivot said pivotal member by lateral deflection of said free end from the unstressed axis of said coil spring whereby relative movement between said resistor and the other of said members causes a sliding engagement and an electrical connection therebetween to vary the resistance of the circuit extending through said pivotal member, said resistor and said stationary member caused by axial movement of said member along said elongated resistor.

2. A liquid level responsive sending unit for fuel tanks and the like comprising: a coil spring support within the tank interior; means supporting and rotatably positioning one end of said coil spring to a tank wall leaving the other end free to move transversely to the axis of said spring; an elongated pivotal member with one end attached to the free end of said coil spring and generally extending in a radial direction therefrom; an elongated stationary member supported in the tank and having a portion extending generally in side-by-side relation with respect to said pivotal member; an elongated wire-wound resistor supported by one of said members and having an end of said resistor electrically connected thereto; insulation means between said resistor and said one member for providing an electrical circuit extending through said one member, said connected end of said resistor and through said resistor; said coil spring supporting means biasing said first end of said coil spring in an angular direction with respect to said free end and attached pivotal member prior to angular positioning said coil spring to the tank wall thereby producing a rotative force on said movable member and a relative pressure between said pivotal member and said stationary member; a float in the tank interior movable as the level of liquid therein changes; means on said float operably engageable with the other end of said pivotal member to pivot said pivotal member by lateral deflection of said free end from the unstressed axis of said coil spring whereby movement between said resistor and the other of said members causes a sliding engagement and an electrical connection therebetween to vary the resistance of the circuit extending through said pivotal member, said resistor and said stationary member by the moving contact of said member with the resistor at infinitely variable positions along the length of the resistor corresponding to movement of said buoyant float.

3. A liquid level responsive sending unit for fuel tanks or the like comprising: a coil spring support within the tank interior; a first end of said coil spring supported by a tank wall; the second end of said coil spring attached to one end of an elongated pivotal member; an elongated stationary member having a portion extending generally in side-by-side relation with respect to said pivotal member and supported in the tank; an elongated wire-wound resistor supported by one of said members and having an end of said resistor electrically connected thereto; insulation means between said resistor and said one member for providing an electrical circuit extending through said one member, said connected end of said resistor and through said resistor; a discharge conduit extending through a wall of said tank and generally in a vertical direction toward the bottom wall of said tank; a generally cylindrically shaped float in the tank interior having an axially extending bore therethrough encircling said discharge conduit and in a movable axial direction thereon as the level of liquid therein changes; means on said float operably engageable with the other end of said pivotal member to pivot said pivotal member by lateral deflection of said free end from the unstressed axis of said coil spring whereby relative movement between said resistor and the other of said members causes a sliding engagement and an electrical connection therebetween to vary the resistance of the circuit extending through said pivotal member, said resistor and said stationary member caused by axial movement of said member along said elongated resistor.

* * * * *